Figure 1:
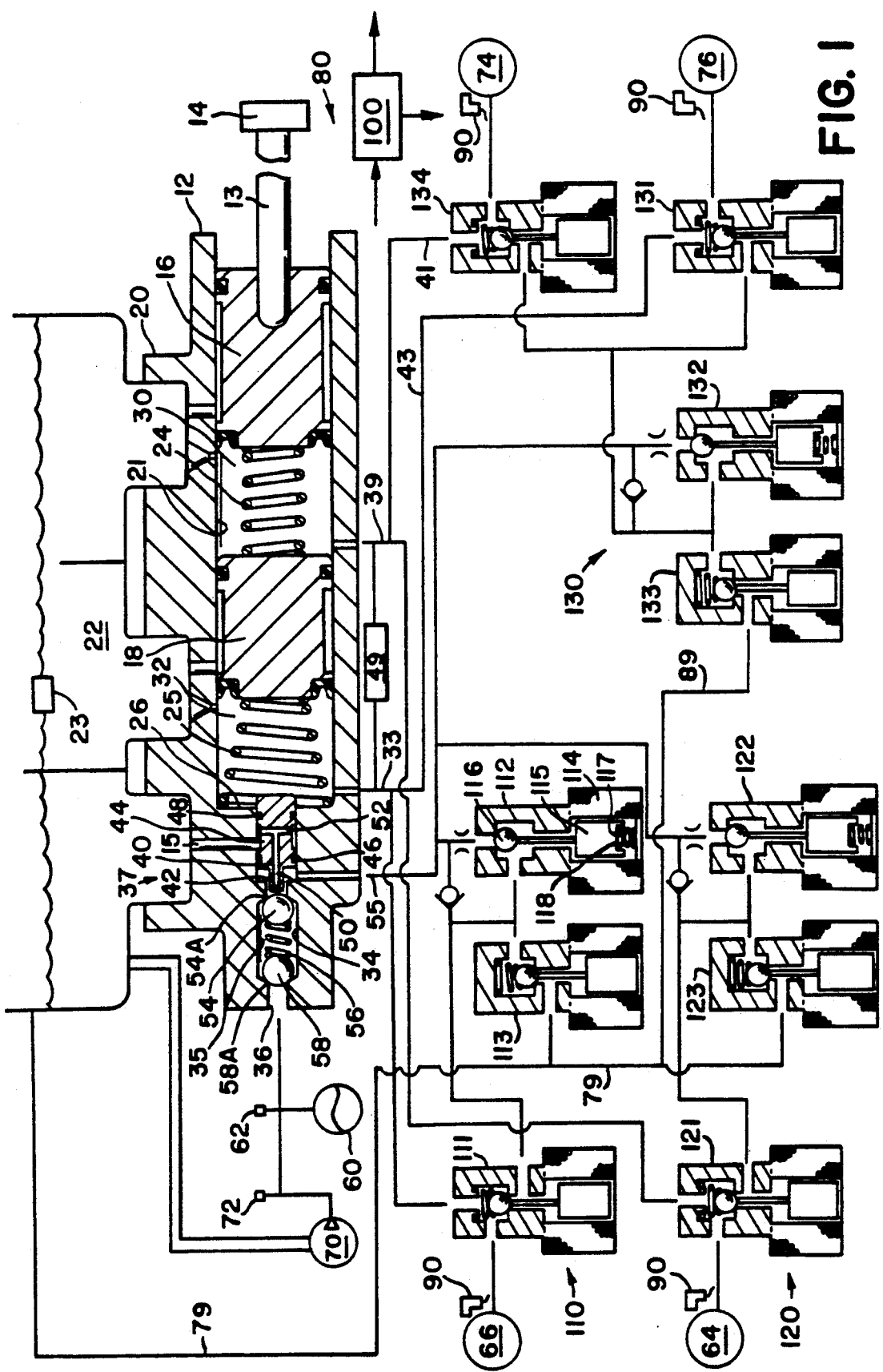

United States Patent [19]
Brown

[11] Patent Number: 5,110,191
[45] Date of Patent: May 5, 1992

[54] MASTER CYLINDER WITH INTEGRATED SUPPLY REGULATOR

[75] Inventor: G. Emerson Brown, Niles, Mich.

[73] Assignee: Allied-Signal Inc., Morristown, N.J.

[21] Appl. No.: 570,931

[22] Filed: Aug. 17, 1990

[51] Int. Cl.[5] .............................................. B60T 8/32
[52] U.S. Cl. ................................ 303/113 R; 303/92; 303/113 TR; 303/119 R
[58] Field of Search ...... 303/113 R, 113 TR, 113 TB, 303/114 R, 114 PN, 116 R, 116 SP, 116 WP, 116 PC, 119 R, 119 SV, 92, 110, 100, 93, 105, 68, 69; 188/181 A, 181 R, 358, 359

[56] References Cited

U.S. PATENT DOCUMENTS

| | | | |
|---|---|---|---|
| 4,627,669 | 12/1986 | Belart et al. | 303/114 |
| 4,688,858 | 8/1987 | Fennel et al. | 303/6 R |
| 4,705,324 | 11/1987 | Kervagoret | 303/119 |
| 4,706,460 | 11/1987 | Kervagoret | 60/565 |
| 4,718,737 | 1/1988 | Bach et al. | 303/114 |
| 4,729,223 | 3/1988 | Kervagoret | 60/566 |
| 4,736,992 | 4/1988 | Hendrickson | 303/92 |
| 4,758,054 | 7/1988 | Brown | 303/114 |
| 4,778,225 | 10/1988 | Rudolf et al. | 303/114 |
| 4,778,226 | 10/1988 | Brown | 303/116 |
| 4,783,125 | 11/1988 | Belart et al. | 303/92 |
| 4,796,959 | 1/1989 | Seibert et al. | 303/119 |
| 4,807,944 | 2/1989 | Weise | 303/114 |
| 4,810,042 | 3/1989 | Kono et al. | 303/92 |
| 4,819,997 | 4/1989 | Reinartz et al. | 303/115 |
| 4,824,182 | 4/1989 | Steffes et al. | 303/92 |
| 4,826,258 | 5/1989 | Ocvirk et al. | 303/119 |
| 4,828,338 | 5/1989 | Ocvirk et al. | 303/119 |
| 4,838,620 | 6/1989 | Sypniewski | 303/116 |
| 4,874,207 | 10/1989 | Nishii et al. | |
| 4,898,432 | 2/1990 | Brown, Jr. | 303/92 X |

FOREIGN PATENT DOCUMENTS

| | | |
|---|---|---|
| 3821225 | 2/1989 | Fed. Rep. of Germany. |
| 2197401 | 5/1988 | United Kingdom. |
| 2224088 | 4/1990 | United Kingdom. |
| 8901431 | 2/1989 | World Int. Prop. O.. |

Primary Examiner—Douglas C. Butler
Attorney, Agent, or Firm—Larry J. Palguta; Ken C. Decker

[57] ABSTRACT

The master cylinder (12, 212) comprises either a non-boosted master cylinder (12), a vacuum servomotor (14) boosted master cylinder (12), or a hydraulic pressure boosted master cylinder (212), each of which includes a fluid supply regulator (37) disposed within an end (26) of the master cylinder (12, 212). The fluid supply regulator (37) comprises a regulator valve (40) disposed within a stepped bore (34, 234) at the end (26) of the master cylinder (12, 212), the stepped bore (34, 234) communicating with the secondary pressure chamber (32, 232) of the master cylinder (12, 212). Hydraulic pressure generated by movement of the secondary piston (18, 218) causes the supply regulator valve (40) to be displaced and open a valve (54) within the stepped bore (34, 234) to permit pressure from a pump (70) and an accumulator (60) to be supplied to the adaptive braking system (80). If the master cylinder (12, 212) should experience a fluid pressure failure, a full stroke displacement of the secondary piston (18, 218) by the vehicle operator causes the secondary piston (18, 218) to engage and displace the supply regulator valve (40) so that fluid pressure is communicated to the adaptive braking system (80) and is directly proportional to the vehicle driver's input force.

14 Claims, 2 Drawing Sheets

MASTER CYLINDER WITH INTEGRATED SUPPLY REGULATOR

The present invention relates generally to a master cylinder which comprises part of an adaptive braking system, and in particular to a master cylinder having an integrated supply regulator for operating the adaptive braking system.

Hydraulic fluid replenishment systems have been utilized in combination with adaptive braking systems. Typically, the boost pressure of the replenishment system is utilized for brake pressure rebuilding during adaptive braking system cycling. This boost pressure is usually directly proportional to the driver input force and is equal to the master cylinder pressure. Vacuum servomotor boosted master cylinders and brake systems do not have a hydraulic boost pressure. As a result, early vacuum servomotor boosted brake systems which were utilized in an adaptive braking system used remotely mounted regulator valves in order to regulate fluid pressure during adaptive braking system operation. These remotely mounted regulator valves provided a boost pressure which was equal to the master cylinder pressure. If the pressure within the master cylinder was low due to a failure of fluid pressure or a limited displacement condition resulting in a fully stroked master cylinder piston, the boost pressure provided by the remotely mounted regulator valves could not be increased relative to the braking input supplied by the vehicle driver. In order to minimize this risk, dual regulators or a dual actuated regulator was utilized. However, this did not provide for all failure conditions. It is highly desireable to provide a regulated boost pressure for an adaptive braking system and which is independent of the pressure within the master cylinder, whether the master cylinder is of the boosted or non-boosted type. Thus, if the pressure within the master cylinder is not available due to a failure or a limited displacement, the independently supplied and regulated boost pressure will remain directly proportional to the vehicle driver's input force. It is also desireable to provide a regulated boost pressure for an adaptive braking system such that during the release phase of braking when adaptive braking has been terminated, there will be no risk of a "supercharge" release of fluid pressure through the master cylinder such that a piston seal may be damaged.

The present invention provides solutions to the above problems by providing a master cylinder with an integrated fluid supply regulator utilized with an adaptive braking system, comprising a master cylinder for operating a braking system of a vehicle, reservoir means connected with said master cylinder in order to provide fluid for utilization by the master cylinder, one end of the master cylinder including a bore having therein a fluid supply regulator for operating a regulator valve disposed adjacent valving means connected with a fluid pressure supply, the bore having connections with the reservoir and with an adaptive braking system line connection, the adaptive braking system connected with the adaptive braking system line connection and vehicle brakes, and control means for operating said adaptive braking system, the regulator displacable solely by fluid pressure effected by a piston of the master cylinder such that the regulator opens the regulator valve and fluid pressure received from the fluid pressure supply communicates through said bore to said line connection and to said adaptive braking system, and said regulator also being engagable by said piston when the piston is substantially displaced so that the regulator effects the opening of the regulator valve and permits pressurized fluid to communicate with said adaptive braking system.

Figure 2:
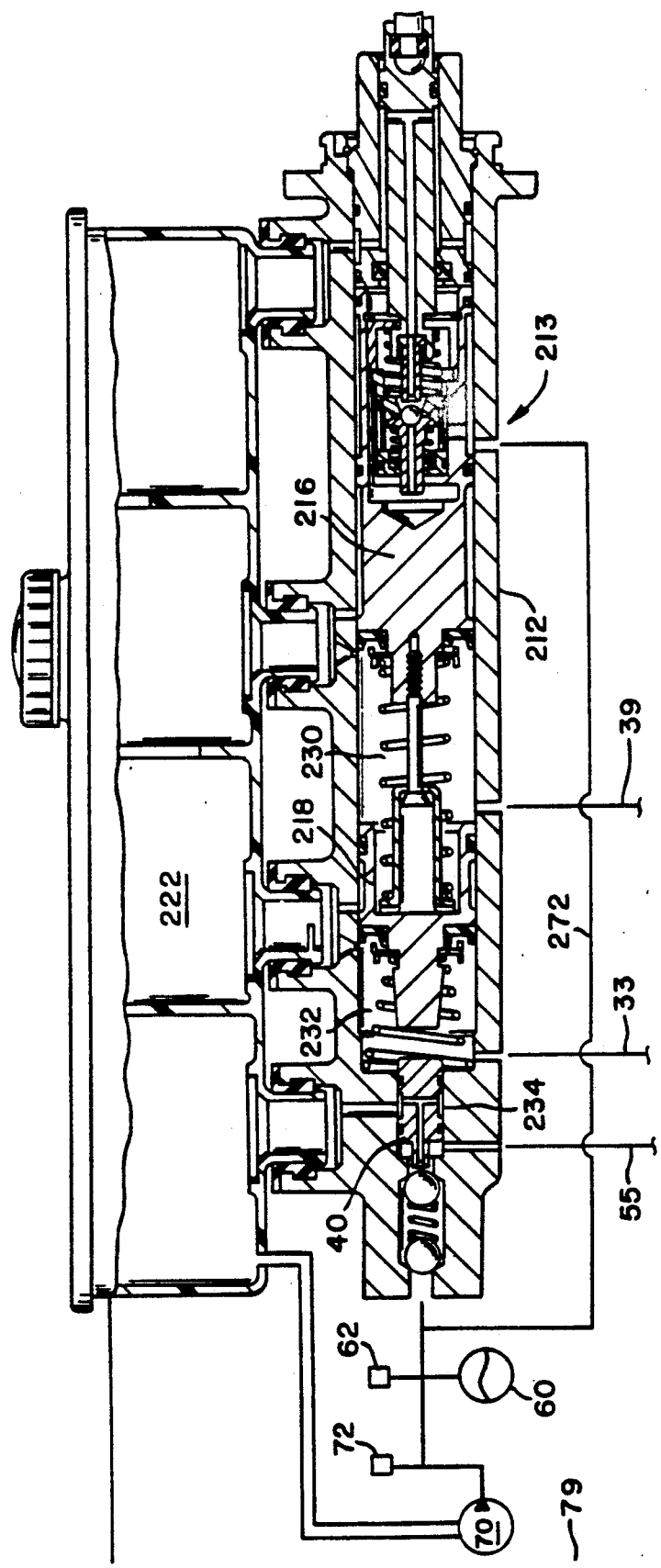

One way of carrying out the invention is described in detail with reference to the drawings which illustrate an embodiment in which:

FIG. 1 is a schematic illustration of a non-boosted and a vacuum servomotor boosted master cylinder with integrated supply regulator and adaptive braking system of the present invention; and FIG. 2 is an illustration of a hydraulically boosted master cylinder utilized with the adaptive braking system.

FIG. 1 illustrates a nonboosted and a boosted master cylinder with integrated supply regulator. Master cylinder 12 is actuated via a rod 13, or rod 13 may be actuated via a vacuum servomotor 14. The master cylinder may also comprise a typical hydraulically boosted master cylinder 212 (see FIG. 2) such as that illustrated in Brown et al. U.S. Pat. No. 4,514,981 incorporated by reference herein. Whether the master cylinder is actuated directly by the vehicle operator, or by a vacuum servomotor, or by fluid pressure boost, the master cylinder includes pistons that effect the transmission of fluid pressure to the vehicle brakes. FIG. 1 illustrates pistons 16 and 18 while FIG. 2 illustrates pistons 216 and 218. In FIG. 1, master cylinder 12 comprises a housing 20 which is coupled with a reservoir 21. Housing 20 includes a bore 21 containing therein pistons 16 and 18 separated by a spring 24. Spring 25 biases secondary piston 18 away from end 26 of housing 20. The reservoir 22 communicates with each of the pressure chambers 30 and 32, in addition to communicating with a stepped bore 34. Stepped bore 34 extends between the secondary pressure chamber 32 and an end opening 36 of housing 20. Disposed within stepped bore 34 is an integrated supply regulator 37 comprising a supply regulator valve 40 which includes an axial end extension 42 and a recessed diameter section 44 located between seals 46, 48. The axial end extension 42 includes a longitudinal opening 50 which communicates with a transverse opening 52 that communicates with recessed diameter section 44. The recessed diameter section communicates with a reservoir connection 15. Stepped bore 34 receives an adaptive braking system line connection 55 which communicates with the end of the supply valve 40 having end extension 42. A separate bore section 35 of stepped bore 34 has therein a regulator ball valve 54 separated from supply ball valving means 58 by resilient means 56. Each ball valve seats on a respective valve seat 54A and 58A. End opening 36 of master cylinder housing 12 communicates with an accumulator 60 which includes an accumulator switch 62 and a pump 70 which includes a pump switch 72. Pump 70 receives fluid from reservoir 22. Reservoir 22 includes a fluid level switch 23.

In FIG. 2, hydraulically boosted master cylinder 212 includes: pistons 216, 218; pressure chambers 230, 232; reservoir 222, stepped bore 234, and a supply regulator 40. Regulator 40, pump 70, accumulator 60 and switches 62, 72 are the same as in FIG. 1. A line 272 transmits pump and accumulator pressure to the valve mechanism 213 of hydraulically boosted master cylinder 212 that is described in detail in U.S. Pat. No. 4,514,981.

An adaptive braking system is indicated generally by reference numeral 80 in FIG. 1 and includes an electronic control unit (ECU) 100 which receives signals from wheel sensors 90 and communicates signals to the pump and valves of the system. The vehicle braking system comprises a diagonal split system such that during normal braking primary pressure chamber 30 communicates fluid pressure to the left front wheel brake 64 and rear right wheel brake 74, while secondary pressure chamber 32 communicates braking pressure to the right front wheel brake 66 and the left rear wheel brake 76. Adaptive braking system 80 includes valve means 110, 120 and 130 for controlling, separately, fluid communicated with the front wheels and for controlling fluid communicated with the rear wheels in combination. It should be clearly understood that the specific configuration of the adaptive braking system can take any one of numerous adaptive braking configurations. FIG. 1 herein is merely illustrative of one type of braking system that may be utilized in combination with the master cylinder and integrated supply regulator of the present invention. Valve means 110 comprises a normally open isolation valve means 111, a blow-by build valve means 112 and a normally closed decay valve means 113. During normal braking, fluid pressure received from secondary pressure chamber 32 is communicated via brake line 33 through isolation valve means 111 and to wheel brake 66. Braking pressure from secondary pressure chamber 32 and line 33 is also communicated via line 43 through isolation valve means 131 to rear left wheel brake 76. In similar manner, braking pressure from primary pressure chamber 30 is communicated via brake line 39 through isolation valve means 121 and to left front wheel brake 64, and through brake line 41 through isolation valve means 134 to right rear wheel brake 74. Brake lines 33 and 39 communicate with a pressure differential switch 49 which will provide a signal in case of brake line failure. A decay line 79 communicates fluid pressure from decay valve means 113 and 123 to the fluid reservoir. Decay line 89 communicates decay fluid pressure from decay valve means 133 to decay line 79.

The hydraulically boosted master cylinder of FIG. 2 is utilized with the adaptive braking system 80 of FIG. 1. During normal braking for the boosters and system of FIGS. 1 and 2, fluid pressure generated in the master cylinder pressure chambers, nonboosted or boosted, is transmitted directly to the vehicle brakes through the normally open isolation valve means 111, 121, 131 and 134. Although the regulator valve 40 is activated by pressure in respective chambers 32 and 232, the blow-by build valve means 112, 122, and 132 and isolation valve means 111, 121, 131 and 134 restrict fluid pressure in line 55 from being communicated to the wheel brakes. Build valve means 112, 122 and 132 each include a spring biased ball valve abutting a rod or armature of the solenoid, whereby the spring force is typically sized to provide a minimum pressure drop across the ball valve. The isolation valve means 111, 121, 131, 134 each include a spring abutting ball, wherein the spring force is typically sized to provide a nominal pressure drop past the ball.

When the adaptive braking system is energized by ECU 100 which senses an imminent wheel lock condition, isolation valve means 111, 121, 131, and 134 are energized so that the vehicle wheels are fluidly isolated from fluid pressure generated within primary and secondary pressure chambers of master cylinders 12 and 212. Fluid pressure built up within respective secondary chambers 32 and 232 as a result of the vehicle operator applying the brakes, causes regulator valve 40 to shift to the left in FIGS. 1 and 2 so that axial end extension 42 seats on ball valve 54 closing flow from opening 50 to reservoir 21. Additional valve travel then displaces the regulator ball valve 54 from its associated seat 54A. Stored fluid pressure from accumulator 60 and pressure generated by the pump 70 flows past pressure displaced ball valving means 58 and displaced regulator ball valve 54 to adaptive braking system connection 55 and system 80 for utilization during adaptive braking system operation. The force of pressure on end extension 42 balances the force of pressure in chamber 32 to hold valve 40 with both extension 42 and valve seat 54A closed. Blow-by build valve means 112, 122, and 132 each permit fluid flow past the respective spring biased ball valve, and energization of the respective solenoid causes the associated armature/rod and ball valve to approach and close the ball valve during adaptive braking cycling, as discussed further below.

Should master cylinders 12 and 212 experience a failure due to a failure of pressure within either of the primary and secondary pressure chambers, regulator supply valve 40 will still operate to supply fluid pressure directly to adaptive braking system 80 and the pressure will be directly proportional to the driver input force. As the driver depresses the brake pedal, pistons 16, 18 and 216, 218 will be displaced and pistons 18, 218 will engage regulator valve 40 and push it against regulator ball valve 54 so that fluid pressure from the pump and accumulator may be communicated with line connection 55 and adaptive braking system 80. Thus, despite a failure of pressure within the master cylinder, the boost pressure supplied to the adaptive braking system is still available and will remain directly proportional to the driver input force, depending on the outer diameter of valve 40.

A significant advantage of the present invention occurs during the release phase of braking when adaptive braking system operation has terminated. In prior systems with remote regulators, when adaptive braking system pressure was released to the master cylinder via the master cylinder pressure chambers of the replenishment type system, the larger fluid pressure within the adaptive braking system could be of such a magnitude that as the master cylinder piston seal approaches the associated compensation opening, the fluid pressure can cause the piston seal to be blown into the compensation opening and be damaged. The present invention provides for release of the adaptive braking system pressure to reservoir via the longitudinal opening 50 and transverse opening 52 of the supply regulator valve rather than through the pressure chambers 30 and 32 of the master cylinder. This eliminates any supercharged release of fluid pressure through the master cylinder chambers and prevents any possibility of damaging the piston seals during adaptive braking system operation.

Each of the blow-by build valve means 112, 122, and 132 constitutes a "nominally open" build valve. Referring to build valve means 112, valve means 112 is normally deactivated and the full stroked ball valve 116 engages its associated valve seat under the biasing force of the spring 117. Spring 117 may be caged in a recess 118 at an end of armature/rod 115. During normal braking, as described above, build valve means 112 may allow nominal fluid flow past ball valve 116 limited by the load of spring 117, and normally closed isolation valve means 111 assists in preventing flow to the wheel brake 66. For adaptive braking cycling, when pressure decay valve means 113 is energized to reduce pressure in brake line 66, the coils 114 energize armature/rod 115 in response to commands from ECU 100. Rod 115 forces ball valve 116 tightly against its seat to stop build flow from line 55. The armature/rod 115 already engages ball valve 116 because the armature/rod 115 is nearly full stroked in the unactivated position illustrated in FIG. 1. When energized by ECU 100, valve means 112 is able to respond very fast because armature/rod 115 already engages ball valve 116 and the stroke is very short. At the end of decay when decay valve means 113 is deenergized, build valve means 112 may be held energized to hold pressure in brake 66 constant, or deenergized to build pressure as described below, or pulsed to step build pressure. During build when coil 114 is deenergized, the force on armature/rod 115 and ball valve 116 is relaxed, and fluid pressure in line 55 moves past vall valve 116 through line 118 and isolation valve means 111 to brake 66.

What is claimed is:

1. A master cylinder with an integrated fluid supply regulator utilized with an adaptive braking system, comprising a master cylinder for operating a braking system of a vehicle, reservoir means connected with said master cylinder in order to provide fluid for utilization by the master cylinder, one end of the master cylinder including a bore having therein a fluid supply regulator for operating a regulator valve disposed adjacent valving means connected with a fluid pressure supply, the bore having connections with the reservoir and with an adaptive braking system line connection, the adaptive braking system connected with the adaptive braking system line connection and vehicle brakes, and control means for operating said adaptive braking system, the regulator displacable solely by fluid pressure effected by a piston of the master cylinder such that the regulator opens the regulator valve and fluid pressure received from the fluid pressure supply communicates through said bore to said line connection and to said adaptive braking system and for communication to wheel brakes only during adaptive braking, and said regulator also being engagable by said piston when the piston is substantially displaced so that the regulator effects the opening of the regulator valve and permits pressurized fluid to communicate with said adaptive braking system.

2. The master cylinder and braking system in accordance with claim 1, wherein the fluid pressure supply comprises a pump and an accumulator which communicate fluid pressure to said valving means.

3. The master cylinder and braking system in accordance with claim 2, wherein the adaptive braking system returns decayed pressure to said fluid reservoir.

4. The master cylinder and braking system in accordance with claim 3, wherein the regulator includes an end extension which is engagable with said regulator valve, the regulator including a longitudinal opening extending from said end extension to a transverse opening which communicates with said reservoir.

5. The master cylinder and braking system in accordance with claim 4, wherein the regulator comprises a pair of spaced apart seals having therebetween a recessed diameter section of the regulator so that the transverse opening communicates with the reservoir.

6. The master cylinder and braking system in accordance with claim 5, wherein said regulator valve and valving means comprise a pair of ball valves separated by resilient means, one of said ball valves engageable by the end extension of said regulator and the other ball valve displaceable by fluid pressure received from said pump and accumulator.

7. The master cylinder and braking system in accordance with claim 6, wherein said adaptive braking system comprises a four wheel adaptive braking system.

8. The master cylinder and braking system in accordance with claim 7, wherein the adaptive braking system comprises a diagonal-split braking system for non-adaptive braking system braking.

9. The master cylinder and braking system in accordance with claim 1, wherein the adaptive braking system includes isolation, build, and decay valve means for each front wheel brake of the vehicle and for rear wheel brakes of the vehicle.

10. The master cylinder and braking system in accordance with claim 9, wherein the build valve means each comprises a nominally open build valve wherein a valve member is biased by spring means to engage a valve seat such that fluid pressure may push the valve member away from the valve seat.

11. The master cylinder and braking system in accordance with claim 10, wherein the build valve includes a solenoid having an armature biased by the spring means, the armature extending to engage the valve member.

12. The master cylinder and braking system in accordance with claim 11, wherein the armature extends by means of a rod which engages the valve member.

13. The master cylinder and braking system in accordance with claim 1, wherein the master cylinder comprises a hydraulically boosted master cylinder.

14. The master cylinder and braking system in accordance with claim 1, wherein the master cylinder comprises a vacuum servomotor booster master cylinder.

* * * * *